Feb. 20, 1934.　　　　W. H. YOUNG　　　　1,948,452
VIBRATORY ELECTRIC MOTOR
Filed Oct. 11, 1933　　　2 Sheets-Sheet 1

INVENTOR.
Walter H. Young
BY
Bemis, Wadsworth Lightfoot
ATTORNEYS

Patented Feb. 20, 1934

1,948,452

UNITED STATES PATENT OFFICE 1,948,452

VIBRATORY ELECTRIC MOTOR

Walter H. Young, Detroit, Mich.

Application October 11, 1933. Serial No. 693,192

16 Claims. (Cl. 175—338)

This invention relates to vibratory electric motors involving the use of an armature subjected to pulsating magnetic influence to effect its vibratory movement, this movement being utilized to motivate tools or other devices such, for instance, as in the operation of a saw blade or cutting tool as it is utilized in the combination forming the subject matter of my co-pending application, Serial No. 693,191, filed Oct. 11, 1933, the present application being a continuation in part of my co-pending application, Serial No. 621,557, filed July 9th, 1932.

Objects of the present invention are to provide a type of armature and mounting therefor adapted to simple construction and assembly and to operation in a highly efficient and satisfactory manner with special provision for the mounting of a flexible leaf-spring armature so that its flexion may not be impeded except insofar as it may be desired to control the amplitude of such flexion.

A further object is to provide such a motor having a work table, upon which work may be located for operation thereon by a tool actuated by the motor, with standards for the table arranged to permit endwise extension of the leaf-spring armature between such standards, and supporting means for the armature spaced outwardly of the aforesaid standards.

A further object is to provide resiliency in the armature supporting means whereby movement thereof will compensate for flexure of the armature and assist in the springing function of the armature; the invention further contemplating variation of the resistance of such supports to flexion of the armature whereby initial tuning or correction of the tuning of the moving parts to any required period or amplitude may be effected.

Still further objects and advantages, subsidiary or incidental to the aforesaid objects, or resulting from the construction or operation of the invention as it may be carried into effect, will become apparent as the said invention is hereinafter further disclosed.

In carrying the said invention into effect, I may provide a motor of a magnetic vibratory type having a magnet capable of being excited by alternating or pulsating electric current, a leaf-spring armature extending across the poles of the magnet with its mid portion exposed to the magnetic attraction of said poles, standards positioned at opposite sides of the magnet and resiliently carrying the extremities of the leaf-spring armature, the standards being capable of variation as to their resilient support of the armature, to vary the amount of resistance offered to flexion of the said armature, and a work table supported by standards spaced to permit extension of the ends of the leaf-spring armature therebetween to the armature supports, whereby the length of the said armature is not restricted by such standards.

All of which is more particularly described and ascertained hereinafter, by way of example, having reference to the accompanying drawings, wherein.

Figure 1:
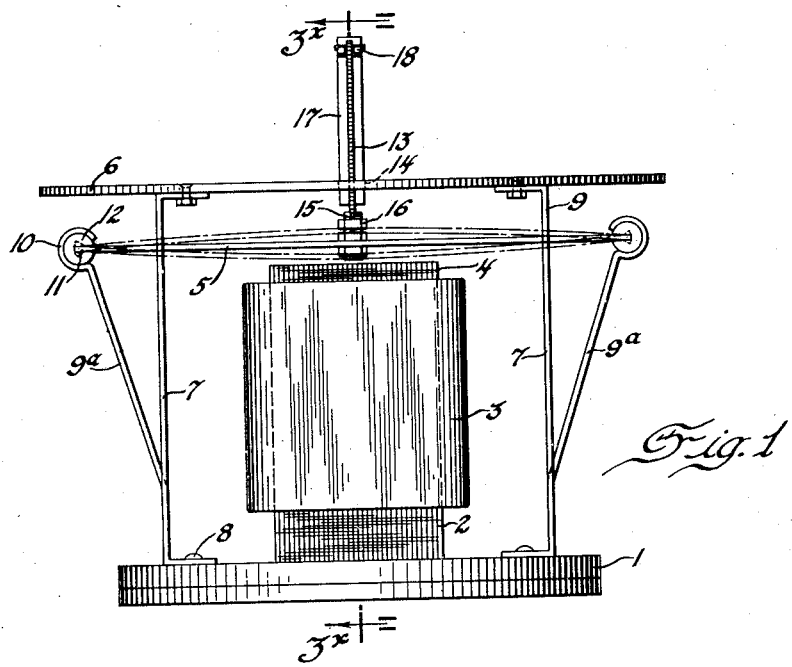
Figure 1 is an elevation of a motor embodying the said invention and shown as being utilized in connection with a jig saw.
Figure 2:
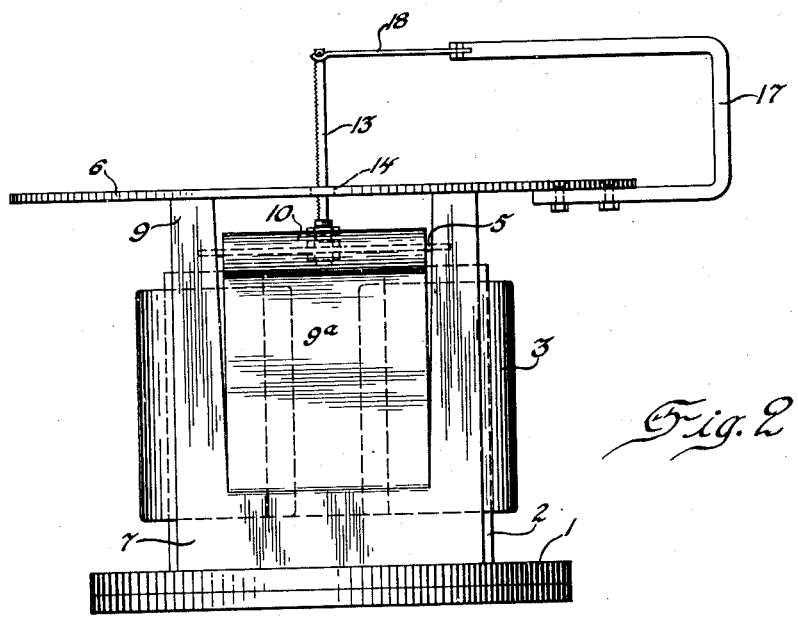
Figure 2 is a side elevation of the same.
Figure 3:
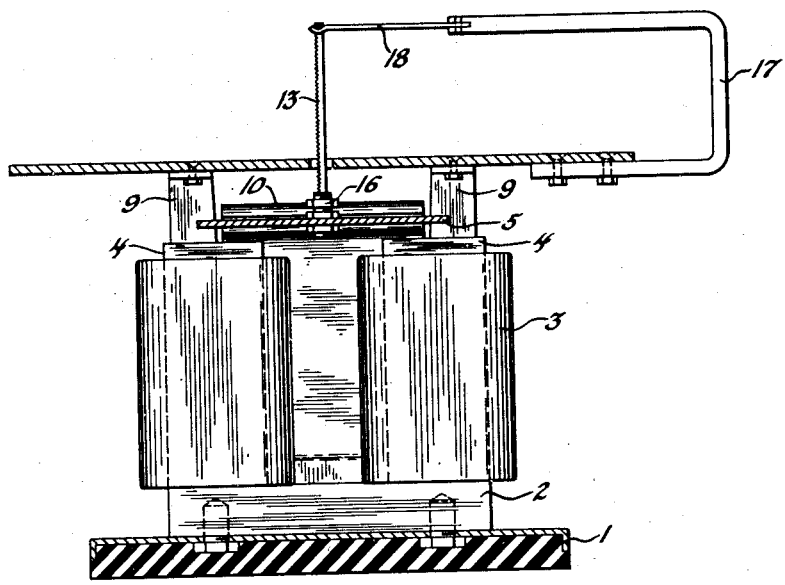
Figure 3 is a vertical sectional view, taken on the line 3×—3× of Figure 1.
Figure 4:
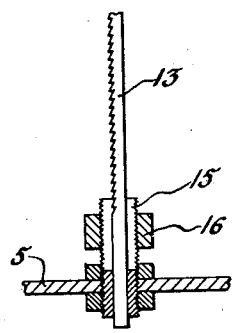
Figure 4 is a vertical sectional detail view of a connection between the saw blade and leaf-spring armature.

Similar characters of reference indicate similar parts in the several figures of the drawings, wherein, 1 indicates a base upon which is mounted an electro-magnet having a laminated U-shaped core 2 with pole pieces 4. The magnet windings 3 are intended to receive alternating or pulsating electric charges of a more or less high frequency. In the case of alternating current the common frequency of 25 or 60 cycles per second is contemplated to set up an intermittent magnetic condition in the pole pieces, as will be well understood.

5 is a vibratory armature which may be of any suitable construction to respond to the high frequency magnetic attraction of the pole pieces 4, and this armature is suitably influenced to return to or somewhat beyond its normal position during the periods when no magnetic attraction is effective, in the present instance this influence being a springing or resilient quality of the armature either inherent as the result of it being constructed of spring steel, or of a naturally resilient metal or material, or the result of its being held at its extremities in a manner inducing tension in the armature when flexed from its normal position by the magnetic attraction.

The said armature 5 is shown as being supported beneath a work table 6 which is mounted on metal standards 7 disposed on opposite sides of the magnet and secured to the base 1 by screws 8. The upper portions of the said standards are trifurcated to form the table-carrying arms 9 and intermediate armature supporting arms 9ª. The upper part of each of the arms 9ª is bent to form a sleeve 10 having an opening through which the extremity of the armature extends into the sleeve. Each extremity of the armature is received and preferably secured in the slots 11 of cylindrical members 12 housed in the said sleeves 10. These members constituting mountings are preferably of resilient or elastic material, such as rubber, and the supporting arms 9ª may also be of a spring-like or resilient nature so that they may flex slightly, in response to the movements of the armature, in order to afford the influence determining the reaction of the armature to the periodic magnetizing of the pole pieces 4 or to assisting such reaction. While, as stated, the supporting arms may be of spring-like or resilient nature, yet this is not necessary as the resiliency afforded by the rubber mountings is sufficient to permit the flexure of the diaphragm.

From this it will be apparent that the motion of the said armature, other than that directly induced by the magnetic attraction, may be the result of resilient qualities in the armature itself or in the support of the armature or of both of these conditions, the precise method of effecting control of the armature movement being subject to the dictates of design or expediency.

In the illustrated case, the armature-supporting arms 9ª may be bent or otherwise distorted, either prior to the mounting therein of the armature or with the armature in position, to provide any desired amount of resistance to the flexion or movement of the armature whereby initial tuning or correction of the tuning of the moving parts to the required vibratory period or amplitude may be effected, and the amplitude or vibratory movement may thus be greatly varied.

The drawings show the improved vibratory motor as being incorporated in a jig saw device wherein a tool in the form of a saw blade 13 is shown as being attached to the armature by means of a split and threaded stud 15 provided with a clamping nut 16. The upper end of the said blade is shown as being connected to a resilient support 18 carried by a goose-neck arm 17.

To obtain the most effective vibratory movement of the armature, as far as conversion of electric power into armature motion is concerned, it is desirable that the said armature should have a vibratory period, either natural or determined by outside influence such as the arms 9ª, substantially synchronized with the impulse frequency of the magnet. In other words, the armature should be "tuned" to agree with such frequency.

It is preferred that the elastic members 12 be maintained under a certain amount of compression in the sleeves 10 and this compression may be varied by pinching or distorting the wall of said sleeves to reduce their diameter. Such variation of the compression of the rubber or elastic members 12 about the ends of the armature will materially vary the amplitude of the vibratory movement or flexion of the armature, so that this feature lends itself also to the controlling of the armature movement. Obviously pinching of the sleeves and distortion of the armature-supporting arms may be severally or jointly resorted to in effecting the armature control.

The described motor admits of a design with freedom from relatively rotating or sliding parts liable to seize or wear, or to require lubrication, and is capable of developing considerable power so that it lends itself to a considerable variety of applications where vibratory motion or impulses may be used.

It will be further recognized that, according to the elasticity or resiliency of the members 12, vertical movement of the ends of the armature 5 may be permitted and taken advantage of within reasonable limits, such as would not prevent effective return of the armature to its normal or neutral position in the available time after movement from that position. This vertical movement of the ends of the armature may operate to add to the amplitude of movement of the armature resulting from its flexion, or may be more or less the principle factor in permitting movement of the armature towards and from the poles of the magnet. In fact, it is conceivable, as will be readily apparent, that, with properly designed support of the ends of the armature as to resiliency in a vertical direction, the armature may move substantially without flexion, the movement of the ends of the armature being substantially that of the armature as a whole.

This invention may be developed within the scope of the following claims without departing from the essential features of the said invention, and it is desired that the specification and drawings be read as being merely illustrative, and not in a limiting sence, except as necessitated by the prior art.

What I claim is:

1. An electric reciprocating motor comprising an electro-magnet, a leaf spring positioned for flexure of its mid portion to and from said magnet, and a pair of flexible arms positioned at opposite sides of said magnet fixed at corresponding ends and carrying the extremities of said spring at their other ends, said arms being flexible to and from the magnet to compensate for flexure of said spring to and from the magnet.

2. In a device of the class described, an electro-magnet, a leaf-spring armature having its mid portion disposed in the field of said magnet, elastic members embracing the ends of said leaf-spring armature, supports for said members, and means compressing said members about the ends of said armature.

3. An electric reciprocating motor comprising an electro-magnet, a leaf-spring armature positioned for flexure of its mid portion to and from said magnet, and resilient supports at the ends of said leaf-spring armature, said supports co-operating by their resiliency in determining the amplitude of movement of said armature, said supports being adjustable to vary their resilient resistance to flexure of said armature.

4. An electric reciprocating motor comprising an electro-magnet, a leaf-spring armature positioned for flexure of its mid portion to and from said magnet, and resilient supports at the ends of said leaf-spring armature, said supports co-operating by their resiliency in determining the amplitude of movement of said armature, said supports being capable of being bent to provide a distortion modifying their resilient resistance to flexure of said armature.

5. An electric reciprocating motor comprising an electro-magnet, a leaf-spring armature positioned for flexure of its mid portion to and from said magnet, resilient supports at the ends of said leaf-spring armature, said supports co-operating by their resiliency in determining the amplitude of movement of said armature, elastic members embracing the ends of said leaf-spring armature, and adjustable clamping means for variably compressing said elements about the ends of said armature.

6. An electric reciprocating motor comprising an electro-magnet, a leaf-spring armature positioned for flexure of its mid portion to and from said magnet, resilient supports at the ends of said leaf-spring armature, said supports cooperating by their resiliency in determining the amplitude of movement of said armature, said supports being adjustable to vary their resilient resistance to flexure of said armature, elastic members embracing the ends of said leaf-spring armature, and means compressing said members about the ends of said armature.

7. An electric reciprocating motor comprising an electro-magnet, a leaf-spring armature positioned for flexure of its mid portion to and from said magnet, resilient supports at the ends of said leaf-spring armature, said supports co-operating by their resiliency in determining the amplitude of movement of said armature, said supports being adjustable to vary their resilient resistance to flexure of said armature and adjustable clamping means for variably compressing said elements about the ends of said armature.

8. An electric reciprocating motor comprising an electro-magnet, a leaf-spring armature positioned for flexure of its mid portion to and from said magnet, resilient supports at the ends of said leaf-spring armature, said supports co-operating by their resiliency in determining the amplitude of movement of said armature, said supports being adjustable to vary their resilient resistance to flexure of said armature, and diametrically variable sleeves carried by said supports compressibly engaging said elastic members.

9. An electric reciprocating motor comprising an electro-magnet, a leaf-spring armature positioned for flexure of its mid portion to and from said magnet, resilient supports at the ends of said leaf-spring armature, said supports co-operating by their resiliency in determining the amplitude of movement of said armature, said supports being capable of being bent to provide a distortion modifying their resilient resistance to flexure of said armature, and adjustable clamping means for variably compressing said elements about the ends of said armature.

10. A magnetic reciprocatory motor comprising a periodically energizable electro-magnet, a plate-like armature provided with ends and having its mid portion disposed in the field of said magnet, mountings for the ends of said plate-like armature, said mountings comprising elastic members compressed around the ends of said armature.

11. A magnetic reciprocatory motor comprising a periodically energizable electro-magnet, a plate-like armature provided with ends and having its mid portion disposed in the field of said magnet, mountings for the ends of said plate-like armature, said mountings comprising rubber members having a slot to receive the ends of said armature.

12. An electric reciprocatory motor comprising a frame, an electro-magnet energizable by alternating current to produce an alternating magnetic field, said magnet being rigidly supported by said frame and having its pole pieces disposed in substantially the same plane, a vibratory armature, spaced mountings for said armature carried by said frame, said armature comprising an elongated substantially flat plate of resilient magnetic metal disposed substantially parallel to the plane of said pole pieces, with its mid portion in the field of said electro-magnet and spaced from said pole pieces, said mountings comprising elongated rubber blocks having slots to receive the ends of said plate, said frame having recesses to receive said blocks, the mid-portion of said plate being vibrated by the alternating field of said electro-magnet to rapidly flex said plate.

13. An electric reciprocatory motor comprising a periodically energizable electro-magnet, a plate-like, vibrating member constructed to be flexed in opposite directions by said electro-magnet, spaced mounting means for said vibrating member engaging opposed faces of marginal portions thereof to clamp the same, said opposed faces of the mounting means being composed of compressible material to provide a resilient connection whereby to permit the movement of said marginal portions relative to the mountings in the plane of the vibrating member, due to the flexure thereof in opposite directions.

14. An electric reciprocatory motor comprising a periodically energizable electro-magnet, a plate-like vibrating armature constructed to be flexed in opposite directions by said electro-magnet, spaced mounting means for said vibrating member, said mounting means being provided with slots, said plate-like vibrating member having portions thereof positioned in said slots provided by the mounting means whereby the same is clamped on adjacent faces and permits the movement of the marginal portions in the direction of the length of said armature when the same is flexed in opposite directions.

15. A magnetic reciprocatory motor comprising a periodically energizable electro-magnet, a plate-like vibrating member constructed to be flexed in opposite directions and having its mid-portion vibrated by said electro-magnet, and spaced resilient mountings composed of compressible material constructed to yieldably support the marginal portions of the vibrating member and to yieldably resist rocking movement thereof when the armature is flexed.

16. An electric reciprocatory motor comprising a periodically energizable electro-magnet, a plate-like vibrating armature constructed to be flexed in opposite directions by said electro-magnet, mounting means for engaging opposed faces of marginal portions of said armature and being composed of rubber whereby movement of said marginal portions of the armature is yieldably resisted during the various flexing movements of the armature.

WALTER H. YOUNG.